United States Patent [19]
Nelson

[11] Patent Number: 5,369,784
[45] Date of Patent: Nov. 29, 1994

[54] RADIO COMMUNICATIONS SYSTEM USING MULTIPLE SIMULTANEOUSLY TRANSMITTING TRANSCEIVERS

[75] Inventor: Dan R. Nelson, Delgany, Ireland

[73] Assignee: City Communications Limited, Dublin, Ireland

[21] Appl. No.: 922,917

[22] Filed: Jul. 30, 1992

[30] Foreign Application Priority Data

Aug. 1, 1991 [IE] Ireland .................. 1761/91

[51] Int. Cl.$^5$ .......................... H04B 7/14
[52] U.S. Cl. .................. 455/51.2; 455/13.1; 455/56.1; 370/60; 370/75
[58] Field of Search ........... 455/7, 71.1, 13.1, 13.2, 455/16, 49.1, 51.1, 51.2, 17, 54.1, 54.2, 56.1, 57.1, 33.1; 375/107; 370/108, 100.1, 75, 97, 60, 54

[56] References Cited

U.S. PATENT DOCUMENTS

| | | | |
|---|---|---|---|
| 4,125,808 | 11/1978 | Graham | 455/7 |
| 4,696,052 | 9/1987 | Breeden | 455/51.2 |
| 4,850,032 | 7/1989 | Freeburg | 455/51.2 |
| 5,040,189 | 8/1991 | Braun | 455/7 |
| 5,054,113 | 10/1991 | Jasinski | 455/51.1 |
| 5,099,235 | 3/1992 | Crookshanks | 455/13.1 |
| 5,128,934 | 7/1992 | Jasinski | 455/56.1 |
| 5,129,096 | 7/1992 | Burns | 455/33.1 |

FOREIGN PATENT DOCUMENTS 0401974 12/1990 European Pat. Off. .

Primary Examiner—Reinhard J. Eisenzopf
Assistant Examiner—Nguyen Vo
Attorney, Agent, or Firm—Price, HEneveld, Cooper, DeWitt & Litton

[57] ABSTRACT

A radio telemetry system has a first transceiver and a large number of further transceivers of which some but not all are out of range of the first transceiver and none of which is out of range of all the others. The first transceiver transmits a radio message having a predetermined format, and each of the further transceivers receiving the message, whether directly or indirectly, re-transmits that message in synchronism or substantially in synchronism with all the other further transceivers which received the message at the same time. Thus, in general, a further transceiver out of range of the first transceiver will receive the message simultaneously from two or more sources. The message contains iteration data which determines the number of times the message is to be re-transmitted.

9 Claims, 14 Drawing Sheets

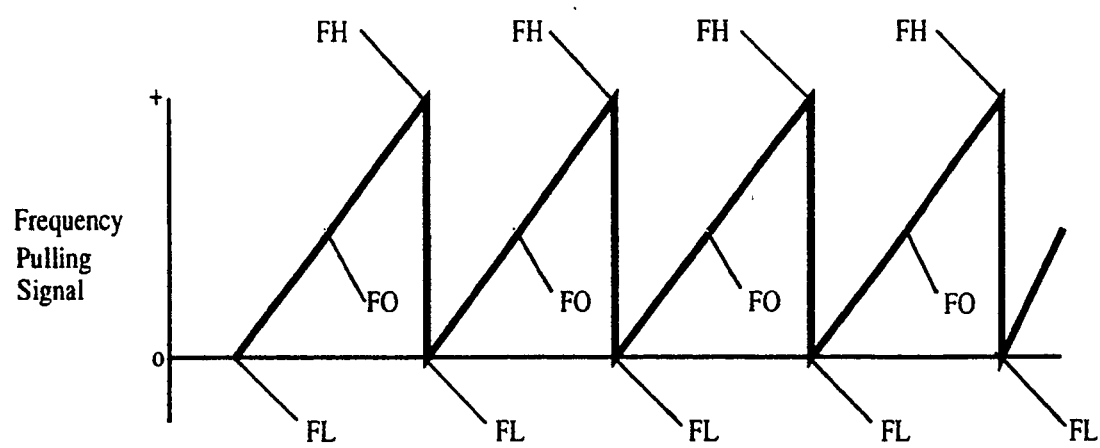
Figure 6
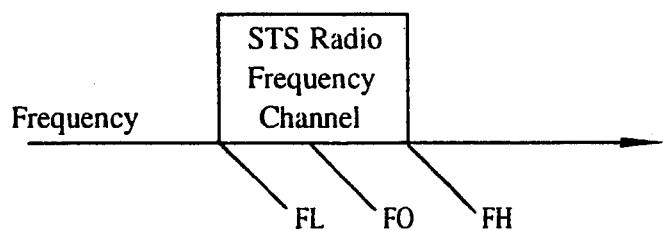

REQUEST ITERATION 1 of 3

REQUEST ITERATION 2 of 3

REQUEST ITERATION 3 of 3

REQ-to-RSP Turnaround (M)

(S1)   (S2)   (S3)

{S4}         {S5}

[S6]

RESPONSE ITERATION 1 of 3

RESPONSE ITERATION 2 of 3

RESPONSE ITERATION 3 of 3

Transaction Complete

RADIO COMMUNICATIONS SYSTEM USING MULTIPLE SIMULTANEOUSLY TRANSMITTING TRANSCEIVERS

This invention relates to improvements in a radio communication system, for example radio telemetry systems.

According to the present invention there is provided a radio communication system comprising a transmitter for transmitting messages having a predetermined format, a plurality of transceivers within range of the transmitter and a plurality of receivers out of range of the transmitter but each within range of one or more of the transceivers, wherein each of the transceivers is arranged, upon receipt of a radio message in said predetermined format and subject to the contents of the message, to re-transmit that message in synchronism or substantially in synchronism with any and all other of the transceivers which received the message at the same time as the first-mentioned transceiver.

In the preferred embodiment the invention provides a radio communication system comprising a first transceiver for transmitting and receiving messages having a predetermined format and a plurality of further transceivers of which some but not all are out of range of the first transceiver and none of which is out of range of all the others, wherein each of the further transceivers is also arranged to transmit and receive messages having said pre-determined format, each of said further transceivers further being arranged, upon receipt of a radio message in said predetermined format and subject to the contents of the message, to re-transmit that message in synchronism or substantially in synchronism with any and all other further transceivers which received the message at the same time as the first-mentioned further transceiver.

An embodiment of the invention will now be described, by way of example, with reference to the accompanying drawings, in which:

FIG. 6 illustrates a frequency pulling technique usable in a network node;

FIGS. 14A to 14H illustrate an interactive transaction;

1. GENERAL DESCRIPTION

The embodiment of the invention is a system for the routing and distribution of digital information throughout a radio telemetry network. The system uses multiple intermediate communication entities or nodes as simultaneous relay links transmitting in a synchronized fashion. The system is referred to in the present specification as "Simultaneous Transmission Support" or STS.

The system comprises a single "master" node and a number, typically a very large number in the hundreds or thousands, of "slave" nodes, which all share a common geographical area or "domain" and also share a single radio frequency channel. Each node is equipped with a low-cost short-range radio transceiver and isotropic radiator (i.e. sends and receives in all directions).

Figure 1:
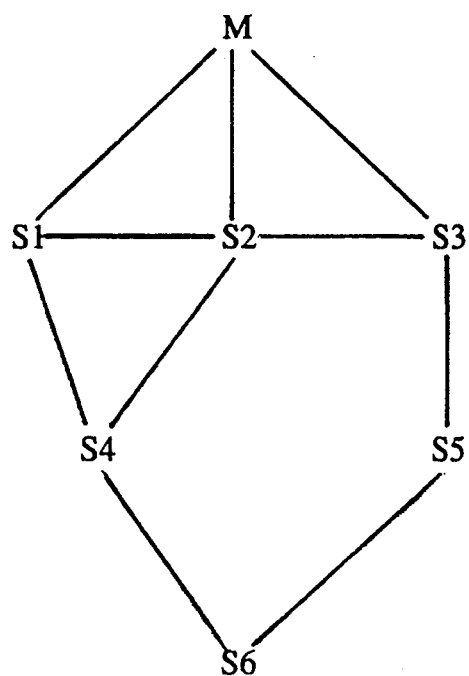
FIG. 1 is a schematic diagram of a simple radio telemetry system of the kind with which the present invention is concerned.

A simplified diagram of a radio telemetry network using STS is illustrated in FIG. 1, which shows a master node M and six slave nodes S1 to S6. The dotted lines depict the wireless communication paths (or data links) between the nodes, and indicate that the master node M may directly communicate with slave nodes S1, S2, or S3. However, network routing or relay links are required for the master node to communicate (indirectly) with nodes S4, S5 and S6. All slave nodes have a fixed position (stationary) with respect to the domain. The master node may be either fixed in position or portable.

It will be understood that FIG. 1 is highly simplified compared to a typical STS network, which would contain overall many hundreds or thousands of slave nodes, of which a first large set of slave nodes such as those shown as S1, S2 and S3 in FIG. 1 will be within range of the master M, a second large set of slave nodes such as those shown as S4 and S5 will be out of range of the master but within range of the first set, a third large set of slave nodes such as that shown as S6 will be out of range of the first set within range of the second set, and so on.

The master node manages the centralized control of the network and performs the required remote information interchange by using network "transactions". An STS network transaction consists of two information components or messages, a request frame and a response frame. The request frame is always initiated by the master node, while the slave nodes are responsible for initiating the response frame. The exchange of transaction frames is performed using bit-serial signaling and two-way alternate communications. Only one active communications transaction may be in progress at an instance.

The basic process is that the master node transmits a request frame or message, containing request data calling for a response by a specified slave node, which is received by those slave nodes in range of the master node. Depending on participation criteria contained in the message, some or all of these latter nodes then simultaneously re-transmit the message, in synchronism or substantially in synchronism, to further slave nodes out of range of the master node but in range of the first-mentioned slaves. These further slave nodes, of which many if not most will have received the message simultaneously from two or more of the first-mentioned slave nodes, then themselves re-transmit the message to slave nodes yet further removed from the master node, and this process recurs until the message has been iterated a pre-determined number of times, as defined in the message. At this point all slave nodes which have received the message examine it to see if they are the destination (target) of the message. If so, the target node constructs a response frame, containing response data appropriate to the request, and sends it back to the master node in several iterations via intermediate nodes in the manner described above.

Unlike conventional routing techniques that use the destination node address to control routing, STS uses "multi-dimensional routing". Multi-dimensional routing propagates the message in many directions simultaneously for each iteration of the message, that is to say, on each iteration the same message is re-transmitted by many intermediate (slave) nodes in synchronism, or substantially in synchronism, so that many if not most of the nodes receiving the message will do so simultaneously from more than one transmitting node. Multi-dimensional routing also improves the directions of reception. This is accomplished by the simultaneous receipt of a message from multiple intermediate routing nodes from many directions.

Because the system does not use fixes routing the master does not need to be fixed in position. Thus it can be mobile, for example mounted in a vehicle, and can visit different parts of its domain at different times to interact with just those slave nodes in its immediate vicinity at any given time. Thus the master node does not have to send a message across the entire network to contact a particular slave node (although that is possible, but can alternatively move into the same neighbourhood as the node.

Also unlike conventional techniques, routing ceases when a pre-specified routing iteration count is reached (the number of re-transmissions defined in the message have taken place). Slave nodes receiving a re-iterated message participate (subject to participation criteria) in the routing process. The slave nodes function as intermediate nodes and continually re-iterate the message until the routing iteration count is reached. Although the target or destination node may have received the message in an early iteration, it will maintain an intermediate nodal state until STS routing is complete.

Iteration data contained in a request frame informs intermediate routing (slave) nodes when to end the intermediate routing process. Once routing completes, all nodes that have received the message check the destination node address in the frame received. If the address is the same as the node's address, the node will perform the information processing specified in the message. If the node's address does not match, no further processing is performed by the node.

The iteration data comprises a "Max Iteration Count" which is the total number of iterations to use in the routing of the message to the destination node or nodes, and a "Current Iteration Count" which is a count associated with the iteration in progress.

The "Max Iteration Count" specifies the maximum number of times that a request message frame will be relayed or routed to the destination (target node). This count is set by the master node and used during the routing of the request frame. The same value of Max Iteration Count is also used in the response frame sent when returning a response to the master node. The Max Iteration Count value remains the same with all iterations of a message as it is routed. The value of Max Iteration Count to set in any particular case is determined by so-called "dynamic adaptation", to be described later.

The "Current Iteration Count" is specified in the initial request message frame to have an initial value of 1. As the request frame is re-iterated, each node receiving the message will compare the two counts. If they are not equal, the node will increment the Current Iteration Count by 1, and re-transmit the message. When the counts are equal (Current Iteration Count=Max Iteration Count), the routing of the message is complete. The recipient nodes (including those which received the request frame on an earlier iteration) will then analyze the message address to determine if they are a "target" of the request message. Target nodes will immediately process the request and return a response.

The responding slave node will set the Current Iteration Count back to 1 and leave the Max Iteration Count unchanged in the response message being returned to the master node. As the intermediate slave nodes re-iterate the response back to the master node, the Current Iteration Count is incremented. When the Current Iteration Count again equals the Max Iteration Count the STS transaction is complete, and all participant nodes terminate the routing process. The master node will process the response at this time, thus completing the transaction.

Participation of intermediate nodes in the STS routing process can be controlled by the master node. The master node accomplishes this by setting participation parameter information in the initial request frame. The extent of participation includes:

a. Unconditional participation (all nodes participate).
b. Participation by relative position within the domain.
c. Position by group or cluster within the domain When an intermediate node receives and validates a message, it will check the participation parameter data. If node meets the participation criteria, it will participate in the remainder of the STS routing process. If the node does not meet the criteria specified by the participation parameter it will not participate in the routing of the message.

A non-participating recipient of the message will continue to track the routing process. This procedure is required to assure that all recipient nodes, whether participating or not, will check the destination address in the message when routing completes. If the slave node is a target of the request message, it will process the message text and perform whatever response action is necessary to fulfill the transaction.

Figure 2A:
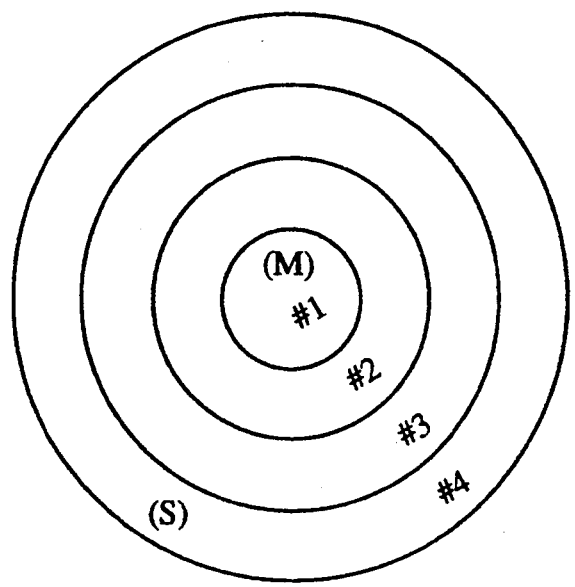
FIGS. 2A, 2B is and 3 illustrate different forms of propagation within a radio telemetry system according to the embodiment of the invention.

FIG. 2A illustrates the STS omni-directional propagation flow during the wireless communication process. Propagation flow occurs in an outwardly expanding circular pattern. Omni-directional network propagation can be associated with unconditional participation (all nodes participate, or position by group or cluster within the domain.

The master node designated (M) is located inside the inner circle of FIG. 2A. Four iterations have been specified. The numbers '#' identify the iteration number. Each circle represents an iteration which is supported by intermediate slave nodes. The target slave node (designated S in the lower left corner) receives the message during the fourth iteration of the request.

Figure 2B:
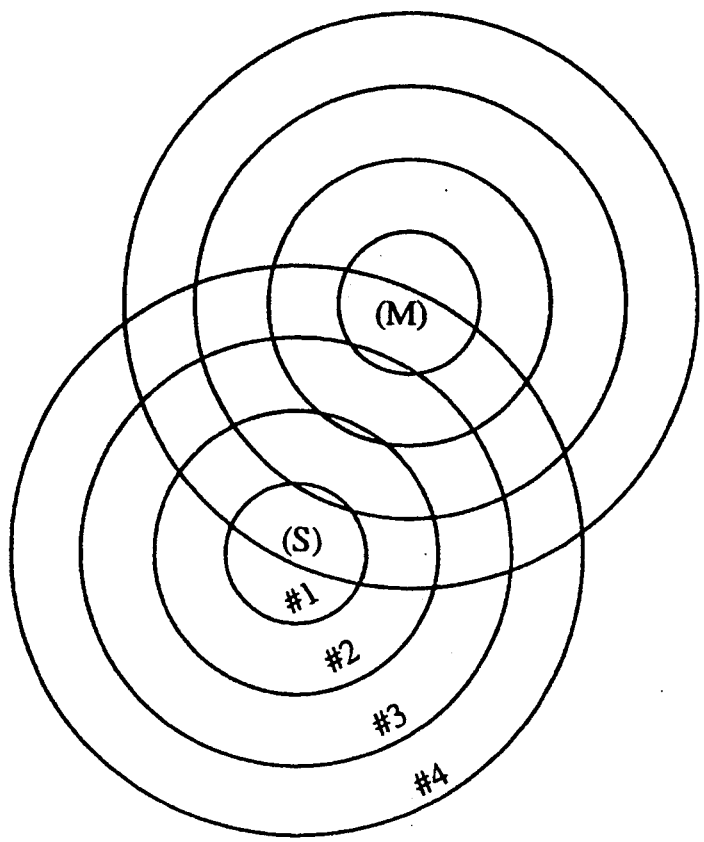

FIG. 2B illustrates the propagation flow when the target slave S responds. Again, propagation flow occurs in an outwardly expanding circular pattern. Four iterations return the response frame to the master, as indicated by the iteration numbers '#'. Only those slaves generally between the target node and the master node participate in the return journey, because the target node is at the edge of the domain. If the target node were not at the edge of the domain, then the response frame would also be transmitted outwardly away from the master as well as towards it as shown in FIG. 2B, until the edge of the domain were reached or after four iterations whichever came first.

Figure 3:
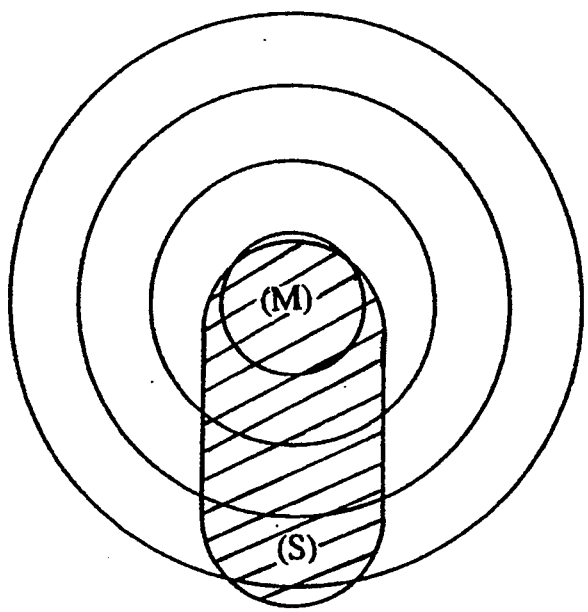

FIG. 3 shows directed propagation flow. Directional propagation can be associated with participation by relative position within the domain.

During directed propagation, the intermediate nodes involved with routing will check their relative position with source and destination address information contained in the message. By analyzing the message source and destination information, it determines if it is in the general direction of message flow. If so, the node may join in on the STS routing process, assuming it also meets other participation selection criteria.

As with the omni-directional propagation example, the target slave node S receives the request during the fourth iteration. Only intermediate nodes generally located between the master and target nodes (i.e. within the dashed oval area) will participate in the routing process, both out and back.

The use of intermediate node participation criteria to select the general direction of propagation flow, by the master node, allows increased STS network routing control. This is especially important when large numbers of slave nodes are eligible to participate in the multi-dimensional routing process. Applications such as remotely reading utility meters could result with the installation of several thousand slave nodes (one per household) within a densely populated urban area.

A unique characteristic of STS is the distributed nature of transmitting radio signals on a single radio frequency band in a synchronized manner. When multiple, low-power, STS transmitting nodes transmit in unison, their accumulated affect can be compared with that of a single much higher powered node. This is a major attribute of STS operation.

A particularly useful feature of the STS process is known as dynamic adaptation. A master node may not know how many iterations are required for a request message to reach a certain slave node intended as target, for example the slave node may have been newly placed in the network, or one or more intermediate nodes previously used to route the message to that slave node may have been removed.

In such a case, the first time the master sends a request to that node as target it defines a Maximum Iteration Count higher than the number of iterations expected to reach the node.

After all iterations of the request have been completed, the target node formulates a response frame which includes a report of the number of iterations taken for the request to reach it, which it can ascertain simply by looking at the Current Iteration Count at the time it received the request. The response frame also contains a Max Iteration Count at least one greater than the number of iterations needed for the request frame to reach the target node. This is a safety factor, because the number of iterations out and back are not necessarily the same.

The response frame is then relayed through the network the number of times determined by the Max Iteration Count. Upon receiving the response frame, the master node will determine how many iterations were required for the response to get back to it from the target node. The master node will also get the outward iteration information reported by the target node. Thus the master node knows how many iterations were needed to get out to the target node, and how many to get back. This information is retained for future use the next time the master node communicates with that target node. When the master does next communicate with that particular slave node, it will for safety set a Max Iteration Count one more than the larger of the number of iterations out and the number of iterations back, as measured for that node previously.

The network transaction described in the foregoing is a so-called "interactive" transaction, in which a request from the master node is targeted at a specific slave node, which is required to respond. However, other transaction types are possible. These include a "broadcast" transaction, which is a request to a multitude of slave nodes where no response is required, and an "overlay" transaction, which is a broadcast request with a single overlayed response frame from many contributing slave nodes. The general scenario of each transaction type, and the associated information flow, is discussed later.

Various applications that could use the STS radio communications network include:
a. Centralized access and concentration of remote measurement (i.e. remote access to utility meter measurements).
b. Centralized monitoring and surveillance (i.e. remote security and alarm systems).
c. Centralized control (and monitoring) of industrial and/or environmental devices.

2. Node Hardware

The STS communication network uses a single radio frequency channel, and switched or keyed carrier communication signaling (i.e. switching the radio frequency carrier on and off) provides the mechanism for coding digital information on the communications channel. Modulation by P1 or P3 type emission is desirable.

STS nodes incorporate low power transceivers, equipped with isotropic (omni-directional) aerials, an intelligent communications controller, and a power supply unit (PSU). A single micro-processor based communications controller can also be used for handling some application end-user functions (e.g. monitoring sensors and manipulating switching circuits). However, intelligent application end-users and compute-oriented application-entities will require support from an additional local micro-processor unit (applications processor).

Figure 4:
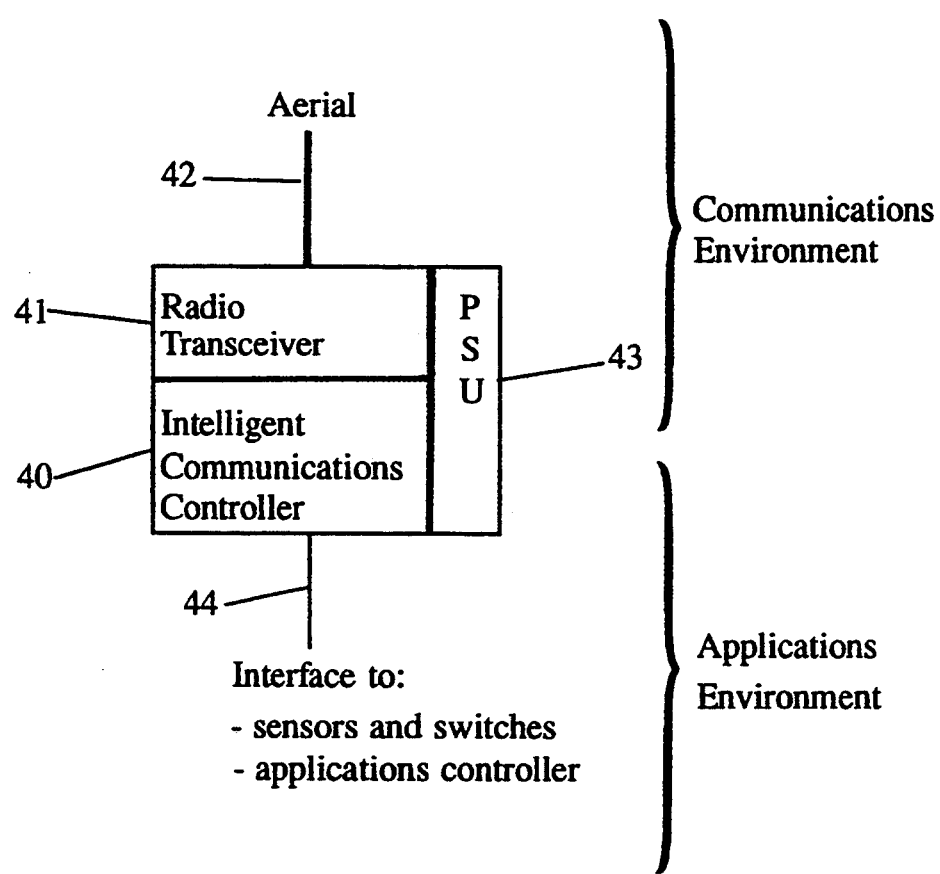
FIGS. 4 and 5 are block diagrams of the hardware components within a network node in the embodiment of the invention.

FIG. 4 illustrates the three main components of a basic STS network node. They are an intelligent communications controller 40 (with interface 44 to application entities), a short range radio transceiver 41 with an isotropic aerial 42, and a power supply unit (PSU) 43.

The micro-controller based intelligent communications controller 40 is the heart of STS. It provides the critical timing and control necessary to harmoniously track and synchronize with other network nodes. Error detection and recovery is also performed by this component.

The personality of the node consists of parameters and/or configuration information specific to the node. The long term personality of a slave node is set at installation time, while the short term or "network management" personality evolves as the network grows.

The master node's personality includes the overall layout and structure of the network. This master personality grows relative to dynamic changes of the network structure. Master personality information may be partially or fully downloaded to meet the needs of the domain. The source of the download would typically be from a higher level centralized controller (host computer) to a network of domains (master nodes).

While a slave node is particularly concerned with monitoring and participating in network activities, the master node is responsible for controlling all network activities. Error recovery and network management is handled by the master node. Since the master node must be aware of the existence of all slave nodes in the network, and the availability of those nodes, additional intelligence and memory is required.

The intelligent communications controller must also provide information processing capability to support simple application entities, especially those associated with STS network management and handling. In addition, an applications interface 44 between the communications micro-controller hardware and the application environment is required.

A serial I/O interface connects the communications controller to the application environment hardware. This interface communications discipline is implemented using a contention oriented protocol. This protocol allows a conversational and interactive exchange of information between the interface end-users.

The intelligent communications controller has complete control of the radio transceiver component. Due to the critical timing required by the communications controller, it will have overall precedence over interface handshaking and nodal control in general.

Three serial interface signal lines are used between the transceiver 41 and the intelligent communications controller 40, as follows:

a. T/R control line—for sending transmit/receive switching signals from controller to transceiver to switch the transceiver between transmit and receive modes.
b. Data out line—for sending signals from controller to transceiver to control the switching of the transceiver's carrier during transmit mode.
c. Data in line—for receiving signals from the transceiver's receive side to the controller during receive mode.

Figure 5:
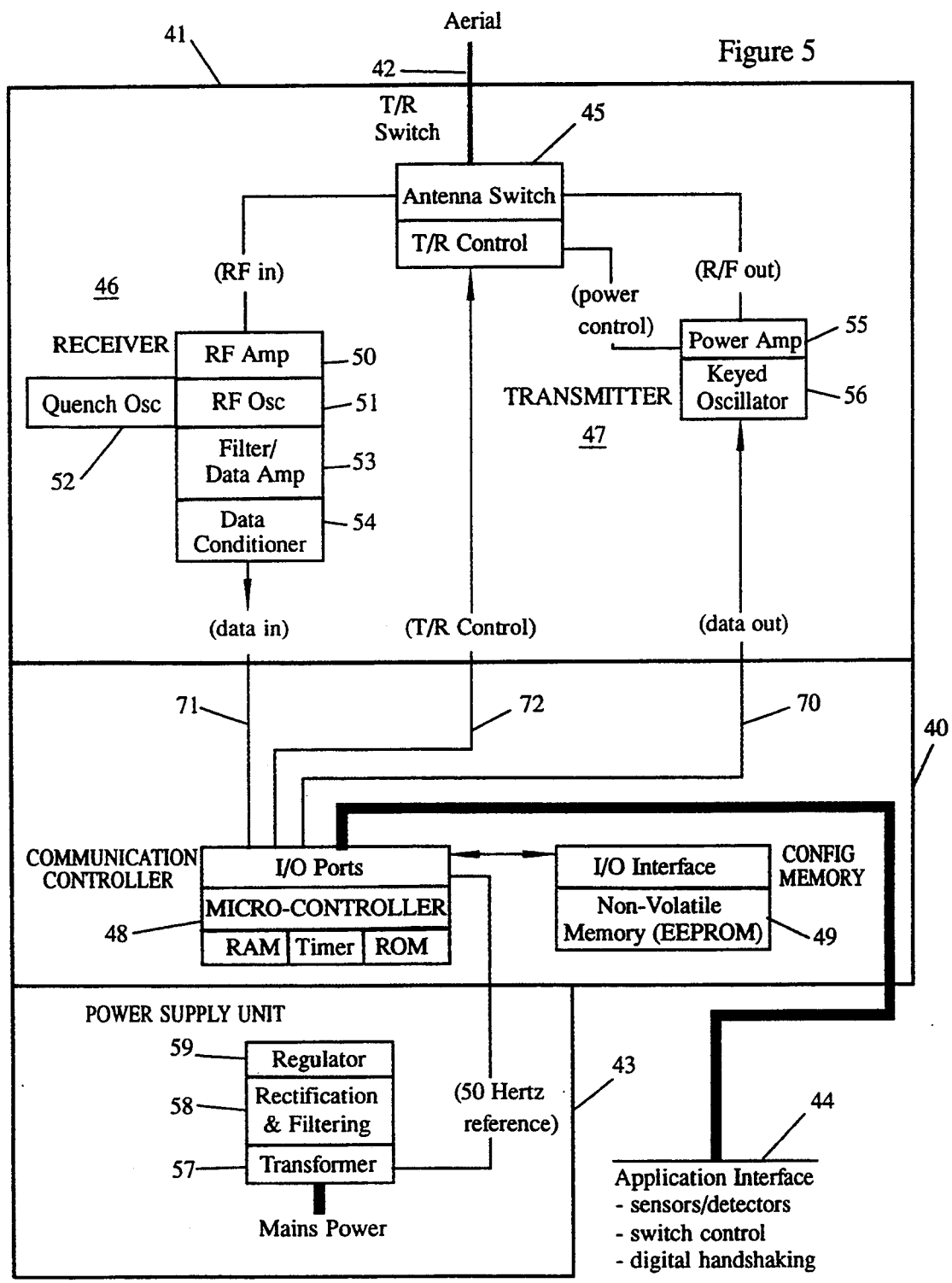

These are shown in FIG. 5, to be described.

The radio transceivers 41 installed in slave nodes are low cost short range communicators. Master node transceivers can incorporate powerful transmitters and more sensitive receivers for providing good communication coverage within the domain. SAW resonators and acoustical delay lines provide simple, low-cost alternatives for the radio transceiver. Digital information is transmitted using pulse modulation techniques over a switched or keyed carrier.

A single isotropic aerial 42 will support both radio receiving and sending. A transmit/receive switch mechanism can be used to switch the aerial to the desired mode. Aerial candidates include dipole antenna (vertically polarized), quarter wave ground-plane and quarter wave whip.

The above aerial types suit situations where space is limited. Aerial height and placement away from obstructions is desirable. Locating the aerial away from the transceiver (via a transmission) line may be necessary.

The PSU 43 provides all the power necessary to operate the hardware. A variety of PSUs types may be specified in order to meet various installation situations and application entity needs. These may include mains power with or without battery backup, battery powered when mains power is not available, and battery and solar-power support. An non-interruptable PSU is desirable in order to improve network availability.

A more detailed description of the node hardware will now be given with reference to FIG. 5, which illustrates a comprehensive block diagram of how an STS node can be implemented in hardware.

The block diagram consists of the three main components shown in FIG. 4 with an applications interface to the hardware. The three components are:

1. Communicator 41 consisting of aerial 42, T/R (transmit/receive) switch 45, wireless receiver 46 and wireless transmitter 47.
2. Controller 40 consisting of intelligent communications micro-controller 48, non-volatile configuration memory (EEPROM) 49 and a bit port 44 interfacing to external application hardware.
3. Power supply unit 43 operating from a mains source (220 volts A.C.)

Wireless communications in the VHF or UHF radio spectrum using a single narrow band channel is the basis of the STS communicator 41. To achieve this, and to keep cost down, the receiver and transmitter use low-cost "SAW" (Surface Acoustic Wave) devices. These frequency stabilization devices provide a very cost effective means for short range data link communicators, and their inherent characteristic is an advantage to the STS operation and networking. Digital information is transmitted using pulse modulation techniques over a switched or keyed carrier.

A single aerial 42 is used by the STS node communicator. An isotropic aerial is required to meet the benefits of STS networking. Aerial candidates include the variety of omni-directional 'vertical whip' style of antenna. This aerial should be located external to the communicator hardware module (typically in close proximity). It is desirable that the aerial is positioned with as much open space around as possible (away from metal objects).

The aerial 42 is shared by the communicator's receiver and transmitter hardware in two way alternate fashion. Aerial switching is performed by the electronic T/R switch 45.

The T/R switch 45 is used to switch the aerial 42 to either the transmitter 47 or receiver 46 as needed. Switching control is provided by the communications micro-controller 48. The use of diodes and diode switching techniques allow the implementation of the T/R switch 45 in a cost effective manner, without the need for costly relays and/or other mechanical switching devices.

T/R control hardware within the T/R switch is used to pass switch control to the aerial switch, as well as to control the power used by the communicator transmitter. This control increases the power utilization efficiency by keeping the transmitter powered off when not in service. It also inhibits any spurious or abnormal radiation from the transmitter (operating normally or abnormally).

The communicator receiver 46 is implemented using a SAW stabilized super-regenerative receiver. In the VHF/UHF spectrum (above 100 MHZ), short range super-regenerative receivers provide considerable benefit with respect to receiver price and performance. With respect to STS, the slightly wider bandwidth exhibited by the SAW stabilized super-regen is desirable.

The individual circuits that make up the receiver 46 are:
  a. An RF amplifier circuit 50 located between the aerial and the RF oscillator (or regenerative detector). The RF amp is untuned and while providing a slight amount of gain it is intended to isolate the regenerative receiver (RF osc) from the aerial.
  b. An RF oscillator circuit 51. This is a SAW stabilized, externally quenched, super-regenerative receiver. It consists of a single port (transistor) RF oscillator/detector.
  c. A quench oscillator circuit 52. This astable oscillator operates at a frequency of 1/10 (or lower) of the radio operating frequency. The quench oscillator toggles the RF osc into and out of oscillation at the rate of several hundred kilo-hertz.
  d. A filter/data amplifier circuit 53. The modulation (information) carried by the radio signal is detected and amplified at the quench rate. The filter/data amp circuit will filter out the high frequency quench and at the same time amplify the information intelligence imposed by modulation. This information (data rate) is restricted to the audio frequency spectrum (a few hertz to 10,000 hertz or more).
  e. A data conditioner circuit 54. The amplified information component superimposed on the radio frequency signal is presented in analog form to the data conditioner. The data conditioner converts this information into a digital form for analysis by the Microcontroller.

The communicator transmitter 47 is designed around a SAW stabilized oscillator. This RF oscillator operates at the same frequency as the receiver (single simplex channel). The T/R switch controls the power to the transmitter thus inhibiting any spurious or local interference to the receiver operating at the same frequency. The transmit frequency oscillator is keyed using P1 or P3 (pulse modulation) techniques.

The SAW device maintains a stability frequency within approximately plus or minus 100 ppm (parts per million) of the operating frequency. This characteristic of SAW resonators pose no problem to the super-regenerative receiver and is of primary importance in STS operation.

The transmitter 47 consist of the following circuits:
  a. A keyed oscillator circuit 56. This is a SAW stabilized RF oscillator which is keyed (pulsed) on and off by the intelligent micro-controller, thereby generating an RF carrier with pulse modulation superimposed with it.
  b. A power amplifier circuit 55. This circuit amplifies and buffers the oscillator loading. Amplification is required to present the proper sign power to the aerial to assure that a required communication distance can be achieved. The buffering aspects prevents loading the oscillator excisively which would result in the pulling of the radio frequency off the desired frequency.

The controller hardware 40 is micro-controller based (for example an 8031 microprocessor) and under software controls maintains the precise timing used by STS nodes, as well as to provide communication intelligence for linking/networking with other STS nodes. At a minimum the controller consists of a single-chip microcontroller 48 and a non-volatile memory 49.

The micro-controller 48 consists of an integrated circuit chip with a read only program which masked into it that identifies software personality of the STS node. At a minimum, this controller includes 256 bytes of working RAM, 4 k bytes of program ROM, a clock timer, and several single bit ports (quasi-directional). The single bit and controller software create the characteristic of the application interface. A highly accurate crystal clock generator is required to assure precise timing of the STS node.

The non-volatile memory 49 is required to assure that the integrity of the node's personality, configuration, and data are secure from potential power interruptions. This memory is implemented using a serially accessible EEPROM integrated circuit of about 256 bytes (1024 bits).

The three serial interface signal lines between the controller 40 and the transceiver 41, referred to earlier, are the data out line 70, the data in line 71 and the T/R control line 72.

The power supply unit 43 provides the necessary voltage/power levels required to operate all the STS node hardware. The supply is powered from the mains power source. This A.C. power source typically operates at 50 or 60 hertz. This 50/60 hertz frequency reference is monitored by the intelligent controller and is used to determine power black outs or brown outs, basic day clock timing, and gross timing functions.

The power supply is capable of maintaining a reliable node environment for a few seconds in the event a power interruption occurs. This allows the intelligent microcontroller ample time to recognize a black out/brown out condition (loss of AC power) and to save any vital working data into non-volatile memory.

The PSU consists of the following circuit components:
  a. Transformer 57. A standard power supply component which provides a voltage step down from the mains source voltage to a voltage that can be converted and used by the STS node hardware.
  b. Rectification and filtering 58. This circuit converts the AC mains source to an unregulated DC component. The filtering capacitance provides sufficient backup power to assure that the STS node can maintain a reliable operation voltage up to a few seconds in the event the mains source is interrupted.
  c. Regulator 59. The regulator holds the STS operating voltages at a precise level to further assure a very stable operating environment.

The foregoing assumes that the transmit frequency is fixed. However, a further refinement is possible to avoid interference effects between simultaneously transmitting nodes.

When two or more radio signals (that are transmitted on the same frequency or wavelength) combine, they do so in a constructive or destructive manner (or some combination thereof). This interference becomes increasingly significant for quasi-strength signals combining at a radio receiving aerial. The effects of constructive and/or destructive interference may be minimised by pulling the transmit carriers 'off frequency' by a small amount and modulating by pulse modulation (P1 or P3 emmission).

The process of frequency pulling can be compared with narrow band frequency modulation; however pulsed frequency/carrier modulation is the actual modulation method. FIG. 6 represents a sawtooth pulling signal altering the frequency of the STS radio transmitter(s). The frequency of the pulling signal is grater than the pulsed data rate (bit frequency of the data being sent), and in the present embodiment the frequency of the pulling signal is about 10 times the bit frequency. Further, the pulling signals are not synchronised at the different transmitting nodes so that they are out of phase between nodes by an arbitrary amount. This minimizes the effects of constructive/destructive interference between two or more quasi-strength signals at a periodic rate less than the data rate. While interference will still occur, the resulting effect appears only as glitches on the pulse.

Figure 7:
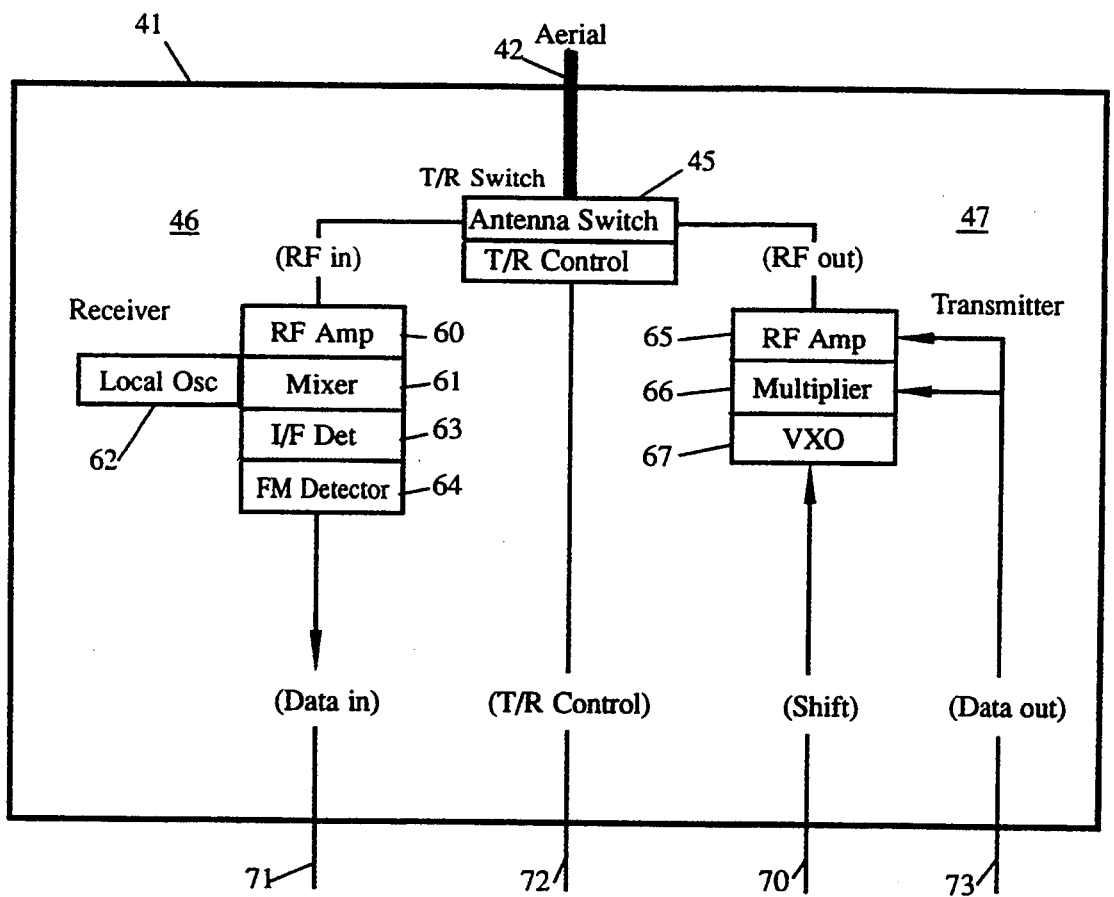
FIG. 7 is a block diagram of an alternative transceiver to that shown in FIG. 5, which implements the technique shown in FIG. 6.

FIG. 7 is a block diagram of a modified transceiver 41 which implements this technique. In this case the transmitter side of the transceiver comprises an RF amplifier 65, a multiplier 66 and a variable crystal oscillator (VXO) 67, and there is a further line into the transmitter from the controller, which is the "shift" line 73.

During transmission the microprocessor 48 provides a sawtooth pulling signal, such as that shown in FIG. 6, on the shift line 73 which is supplied to the VXO 67. The phase positioni of pulling signal is determined at the node by the node's task manager, so that the phase position of the pulling signal will be pseudo-random relative to that of other pulling signals at other nodes. The VXO 67 oscillates at a frequency of 20 MHz and the shift signal causes the VXO output frequency to vary in sawtooth manner. The output from the VXO 67 is multiplied up to 180 MHz by the multiplier 66 and the RF amplifier 65 amplifies the multiplied signal for application to the aerial 42. The result is frequency pulling of the transmission carrier as shown in FIG. 6.

Both the RF amplifier 65 and the multiplier 66 are switched on and off by the pulses on the data out line 70 to provide the keyed carrier output from the node.

FIG. 7 also uses an FM discriminator (detector) in the receiver side of the transceiver 41, instead of a super-regenerative receiver as previously described. While the latter can provide satisfactory results in recovering STS data pulses, the FM discriminator is particularly suited for the STS process.

Thus the receiver comprises a typical superhetrodyne receiver front end (comprising RF amplifier 60, mixer 61, local oscillator 62 and IF amplifier 63) with an FM discriminator 64. The front end is designed for narrow band use on the STS radio channel. However, the FM discriminator 64 is designed with a relatively wider bandwidth capability and is de-tuned slightly off the STS radio channel.

Figure 8:
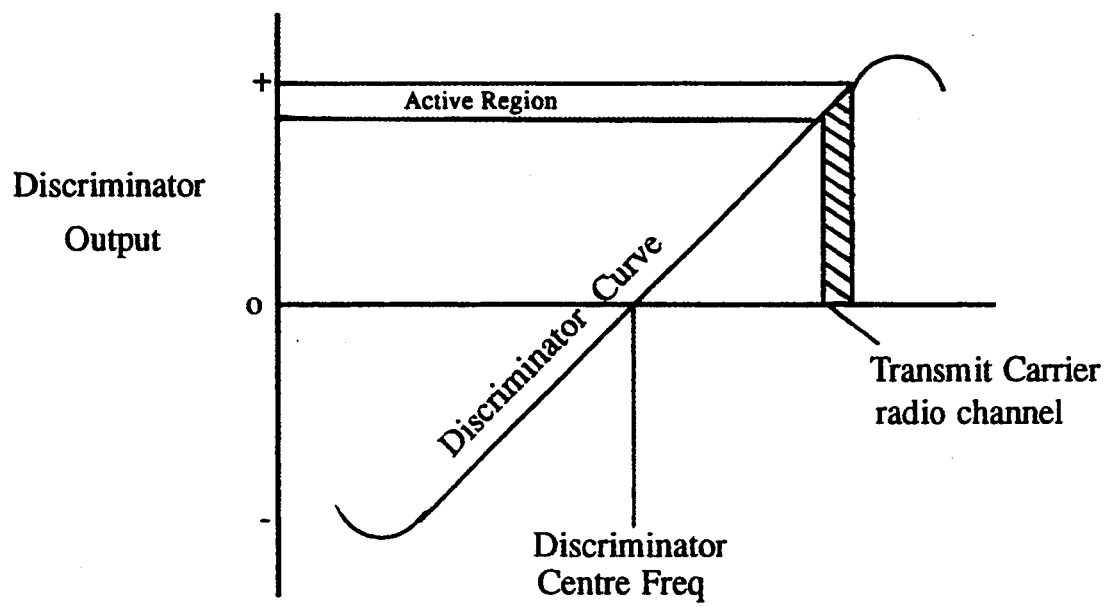
FIG. 8 illustrates the operation of the receiver section of FIG. 7.

In this case, unlike a conventional FM receiver where the modulated signal is recovered relative to a frequency either deviation above and below a centre frequency, STS signal detection/recovery occurs at an offset of the discriminator centre frequency and at a much narrow bandwidth. FIG. 8 illustrates the narrow band active pulse region in relation to the discriminator's operation. The detection of P1 or P3 pulses are replicated at the output of the discriminator.

3. Coding Techniques.

A variety of pulse modulation techniques, using switched carrier keying, can be used. Pulse modulation provides good immunity to noise and a better signal to noise ratio. A brief description of methods suitable for use with STS communications are discussed below.

Pulse Width Modulation or PWM is a technique for sending patterns of the width of carrier pulsed. For modulating a binary signal, only two pulse durations (widths) are required, a pulse for ⅓ of a bit cell period indicates a ZERO bit and a pulse for ⅔ of a cell period indicates a ONE bit. The transition of the rising edge of the pulse provides the bit synchronization timing required to recover the bit. The automatic gain control (AGC) exhibited by receiver hardware favours PWM.

Pulse Code Modulation (PCM) is a communication system of coding signals with binary digital codes to carry the information. A pulse for ½ cell period indicates a ONE bit and no pulse in the cell period indicates a ZERO bit. One bits are used to maintain bit synchronization. A one bit's leading edge is the reference for the start of a bit cell. Since zero bits are indicated with the absence of a pulse, a previous one bit's timing is used as a reference.

A variation of PCM incorporates a bit-timing reference pulse for all bits. The coding of digital signal to carry the information occurs after a reference pulse present in all bit cells. As with PCM, binary signals are represented by the presence or absence of a pulse following the reference pulse. A ONE bit is encoded as a second pulse in the bit cell, and a ZERO bit coded as the absence of a second pulse in the bit cell. Since zero bits are reflected as the absence of the information carrying pulse in the bit cell, a string of zero bits will establish a timing reference for the digital string or frame.

Manchester coding uses the phase of a square wave signal to indicate a digital one or zero as shown below. Every signaling interval (bit cell) contains a transition to provide a good reference for timing recovery and every interval contains an equal amount of positive and negative level for no dc wander. A ONE bit is indicated by a 'negative' going pulse at mid-cell time and a ZERO bit is indicated by a 'positive' going pulse at mid-cell time. Bit synchronization is established at the beginning of each bit string. Each bit is synchronized by transition (rising or falling) of the signal.

Since this coding method relies on rising and falling edges to code the digital signal, it cannot be used with the STS "overlay transaction". This is due to the probable overlay of both a zero and one transition simultaneously by two or more contributors. The result cannot be decoded. It is possible however to combine Manchester coding with another pulse code technique to alleviate this drawback.

4. Message Frame—Receiving and Sending.

Communication message frames are the smallest information entity exchanged between network nodes. While switched carrier communications signaling provides the basis for encoding and decoding bits of information, the network message holds the information intelligence of conversing network nodes. The message information contains both communications network management and applications information components.

Figure 9:
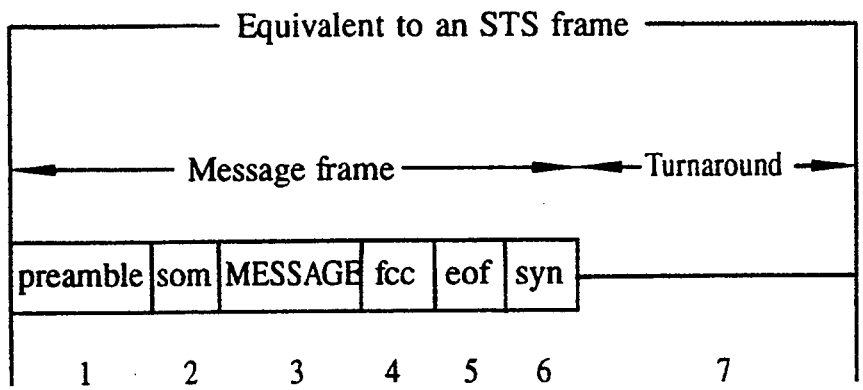
FIG. 9 is a diagram showing the format of a message frame transmitted within a network according to the embodiment.

Digital coded messages, which are exchanged and routed over the communications network, are communicated bit serially. The format of the communication (message) frame that carries the digital message is shown in FIG. 9. The critical STS signaling turnaround time (i.e. from send to receive and visa versa) is also included. The combination of message frame and turnaround time are the important elements of a fully synchronized STS system. FIG. 9 is equivalent to a single STS request or response iteration that is routed throughout the wireless network, and comprises the following communication and timing entities:
1) preamble (initial bit/frame synchronization info)
2) som (start of message indicator)
3) MESSAGE (including communication information such as:
   length of frame
   whether it is a request or response frame
   destination address (target node)
   max count, current count
   participation data and also application info
4) fcc (frame_check_characters)
5) eof (end of frame indicator)
6) synchronization data (a series of pulses of known duration and interpulse spacing)
7) turnaround (send/receive turnaround time)

Figure 10:
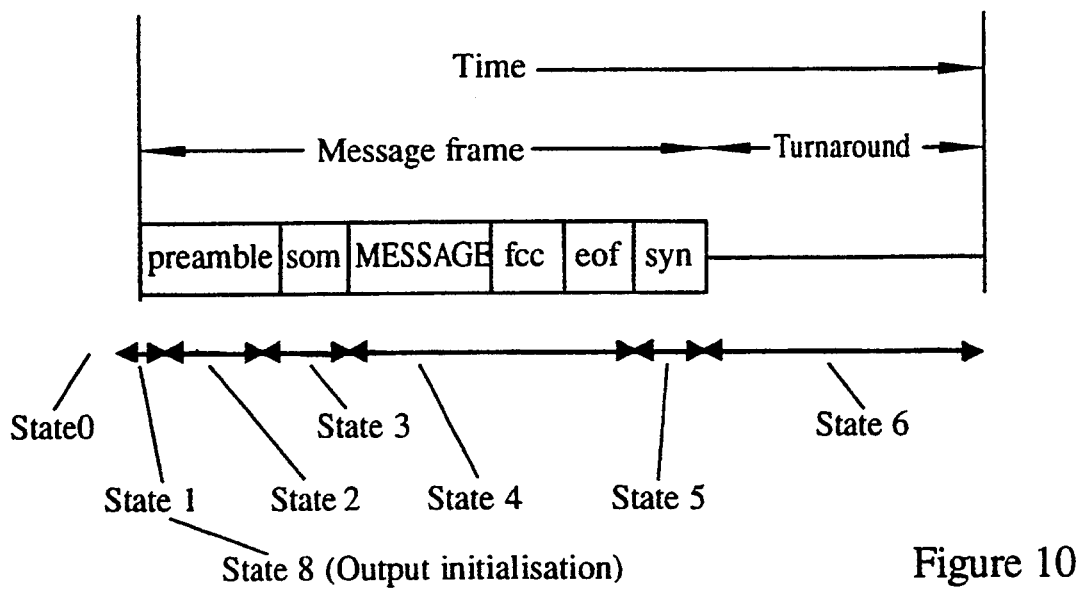
FIGS. 10 and 11 illustrate states of a network node during the receipt and transmission respectively of a message frame.

FIG. 10 illustrates a practical implementation of signaling recovery by the intelligent communication controller 40.

The receive process monitors the communications channel for incoming messages. The serially organized communication frame can be processed in finite stages or states. These states and their relationship to the incoming communications frame is illustrated below.

States 0, 1, and 2 are concerned with initialization, frame I/O initiation, and frame synchronization respectively. State 1 determines if an output (send operation) is to be initiated. Output has precedence over input and State 1 will pass control to State 8 when applicable.

Receive states 0, 1, and 2 complete when frame synchronization has been verified, and state 3 is then encountered to verify frame synchronization is maintained, and to monitor for start-of-message (som).

When the "som" indication is detected, state 4 is entered. The message information is received bit serially and assembled into characters. Upon detection of the end of frame character in the message string, state 4 terminates. At this point the message and associated frame check information have been saved.

Prior to validating the frame received, state 5 will monitor and lock onto the synchronization data, as will be described in the next section. Briefly, however, by analysing the synchronising data at the end of the message frame (the most stable part of the frame) the node attempts to compensate for delays and distortions in the signal as received and detected by the node, in order to determine the actual point in time at which the synchronising data ends in the signal as transmitted. In other words the node attempts to determine the point in time at which the end of the synchronising data would have been detected by the node in the case of perfect, distortionless, delayless reception and detection.

This point in time, which is referred to as the Sync Reference Time (SRT), should be the same or substantially the same point in time for all receiving nodes, and substantially independent of the received signal strength and internal node delays. This process (establishment of a common or substantially common SRT) is required to allow all recipient nodes to properly synchronize or align their subsequent transmissions.

Beginning at the SRT, the turnaround state 6 is entered. All transmit/receive digital signaling ceases during turnaround. During this precisely timed pause, which is the same for all nodes participating in the STS process at that iteration of the message, the message frame just received can be validated and processed. If the receiving node determines that it must participate in the routing of the message received, or that it must provide a response, it will not do so until the turnaround time expires. Thus it is ensured that each node begins transmission only at the end of turnaround time, and because this is measured from the SRT, all transmitting nodes will be in synchronism or substantially so. Meanwhile, in preparation for transmission, if it is to resend the frame it will increment the Current Iteration Count in the frame by 1 and modify the message check sum accordingly, or if it is to provide a response it will build a response frame in which it will set the Current Iteration Count to 1.

An additional state 7 (not shown in FIG. 10) also exists. This state provides a common fallout for error, exception, and abnormal conditions that might arise during the handling of states 1 through 6. In addition, state 7 may also be entered from an STS send timing state. State 7 is responsible for handling and/or reporting the error condition and purging the current receive or send operation. When complete, state 7 typically exits to the initialization state 0.

Figure 11:
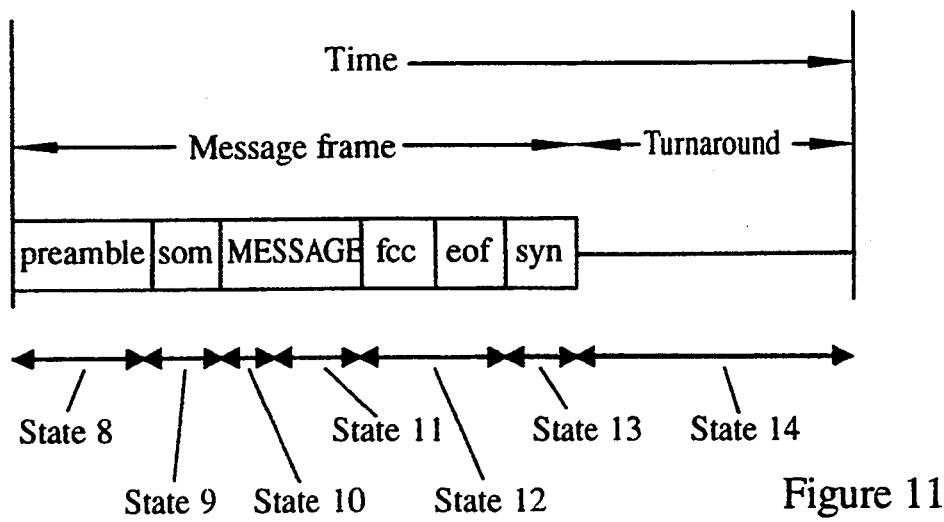

FIG. 11 illustrates a practical implementation of sending an STS message frame. The message frame to be sent may be the initial message from a source node (request frame from a master node or response frame from a target slave node) or it may be a routing iteration of the message by a slave node. The various bit serializing and output signaling states required to properly perform network synchronized output are shown.

State 8 initiates the output operation by generating and sending the preamble of the frame. State 9 follows the preamble and is used to send the start-of-message flag.

The message component of the frame consists of two states. State 10 is the network oriented information such as length of frame and Max and Current Iteration Counts, while state 11 is associated with the data associated with the application. During the generation and sending of states 10 and 11 information, a message check sum is accumulated.

State 12 sends the accumulated message check sum and also outputs the end-of-frame character. At this point the message frame proper is complete. Next, the trailing edge of the message frame data is padded with the synchronisation data which as described above is needed by the recipient nodes to properly synchronize with the network. State 13 generates the necessary signals required for the synchronizing sequence. State 13 will also setup the required turnaround time value.

On entry to state 14 (turnaround), the intelligent communications controller is notified of the message output completion. The iteration count contained in the message frame just sent is checked to see if another iteration is required. If so, the node increments the Current Iteration Count in the message frame just sent, which is still retained in the node in a buffer, and modifies the message check-sum accordingly in preparation for re-sending the frame once again. However, state 14 (turnaround) must complete before another output (iteration) can be initiated.

In this connection it is to be understood that, except in the case of an overlay transaction where the node alternately transmits and receives in consecutive iterations as will be described, when a node has received a message frame all remaining iterations of the routing process are processed as transmit sequences by the node until all iterations have been sent. Thus the message frame is retained in the buffer and is re-sent in each iteration of the message until the routing process is complete (Current Iteration Count=Max Iteration Count).

When the communications controller determines that the last routing iteration has completed, it checks the destination address(es) supplied in the message frame with its own. If a match occurs, that node is a specified destination and the application information of the message is processed and an immediate response formulated (if applicable). Any response or reply to be performed is inhibited until the final state 14 turnaround is complete.

5. Synchronisation

Due to physical and environmental deviations, 100% synchronization between all simultaneously transmitting slave nodes is not possible. However, it is possible to maintain a relatively stable percent of deviation which is acceptable for maintaining network message integrity and flow.

In the present embodiment, slave nodes are maintained in synchronism to an acceptable extent by:

1) Using low data rates (200 to 800 bits per second).
2) Using highly accurate node internal timing (accurate to within ⅓ of one percent of a bit).
3) Compensating for signal distortion and delays at the node (message alignment).

The first factor, low data rate, is the single most important requirement for the STS network. Clearly, the lower the data rate the less accurately one needs to synchronise the nodes. In addition, short message frames will aid the nodes in maintaining synchronization integrity. The synchronization deviations resulting from internal node timing and message alignment (factors 2 and 3 above) have less of an impact of total network synchronization when low data rates are used.

The second factor above implies a highly accurate and responsive intelligent communications controller be used. This is accomplished by using a computer based (micro-controller) intelligent communications controller using a crystal timing standard, as described.

Software is the intelligence of the communication controller. Although the highly accurate crystal clock supporting the micro-controller hardware presents synchronization deviations of well under 1 percent, software reaction time is significant. By using low cost, off the shelf micro-controller units, reaction times in the order of from a few microseconds to approximately 30 microseconds can be expected.

While the use of low data rates and highly accurate internal node timing will substantially assist in maintaining acceptable synchronism between simultaneously transmitting nodes, it is still necessary (unless one is prepared to accept very low data rates and/or use very costly hardware) to compensate for signal distortion and delays at the node (message alignment).

Message alignment is performed at the end of the received message. The purpose for this is to allow the radio transceiver receiving hardware to acquire a stable operating state when receiving the message.

Thus, as mentioned above, prior to validating a received message frame the node analyses the duration and timing, as perceived by the node, of the synchronization pulses at the end of the frame. Since the node has stored reference data defining what the synchronising pulse characteristics should be in the case of perfect reception, it is able, by comparing the synchronising pulses as received and detected with the stored data, to compensate at least to a large extent for delays and distortions in the received signal, in order to determine the actual point in time at which the synchronising data ends in the signal as transmitted (Sync Reference Time, or SRT).

Two distinct areas of correction are required to assure a tolerable message alignment by simultaneous transmitting nodes. These are in relation to (i) transceiver hardware/software characteristics and efficiency, and (ii) received signal strength and integrity.

Figure 12:
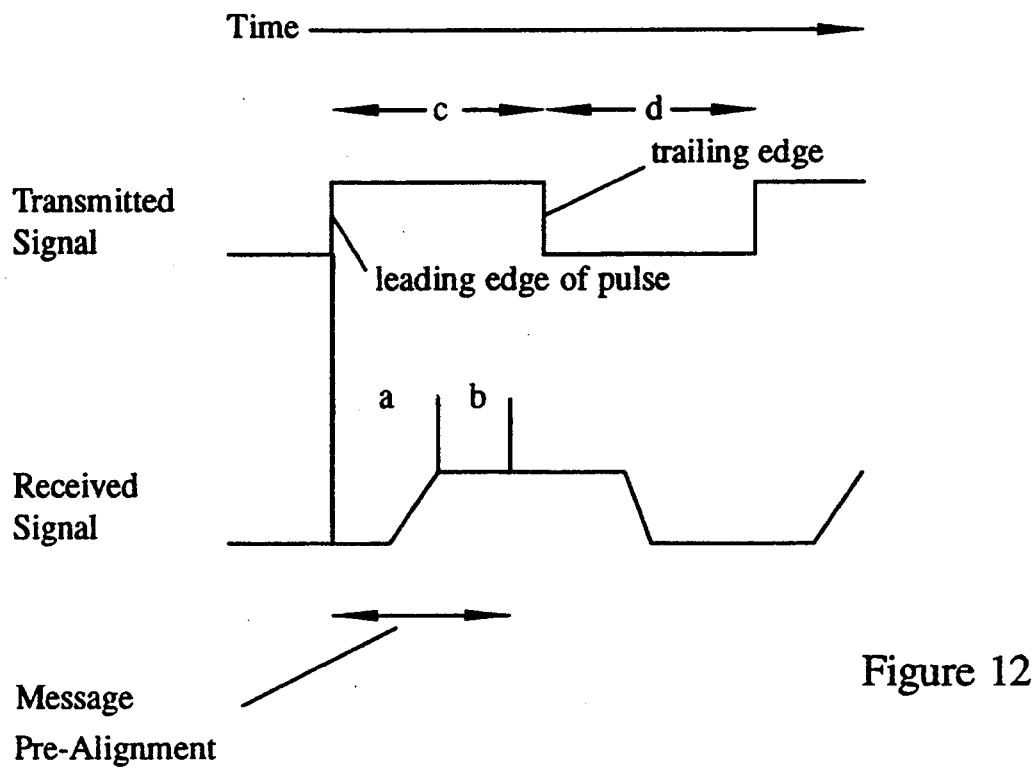
FIGS. 12 and 13 are pulse diagrams to illustrate how nodes are synchronised.

FIG. 12 illustrates the basic communication delays between the actual timing of the transmitted signal and the node's perceived timing of the same signal as received, and identifies the general delays associated with the specific receiver hardware in use, and micro-controller speed and software efficiency.

As mentioned above, the transmitted signal comprises pulses of radio frequency energy, using modulation by P1 or P3 type emission. These modulation methods superimpose the information intelligence within the pulse stream (or message) by controlling the pulse energy switch "ON" and "OFF" timing.

In FIG. 12 a synchronising pulse in the actual transmitted signal is identified by pulse ON time (c) and pulse OFF time (d). The precise timing characteristics of the pulsing is known by the receiving STS nodes.

The received pulse's leading edge is distorted slightly. This is due mainly to the signal strength of the received signal and the reaction time of the receiver circuitry (hardware). This delay is identified by (a). At the end of time period (a), the conditioned signal at the receiver is presented to the micro-controller for analysis and processing. Reaction time of the micro-controller, in conjunction with software efficiency, will cause a further delay (b). At the end of period (b) the micro-controller has locked onto the pulse's leading edge. This locking deviates from the transmitted signal by the sum of delays (a) and (b) discussed above.

The intelligent micro-controller therefore adjusts its perceived timing by the factor determined by the general characteristics of (a) and (b) above. This correction is shown in FIG. 12 as 'message pre-alignment'. This process is the first step in the STS synchronization process.

Figure 13:
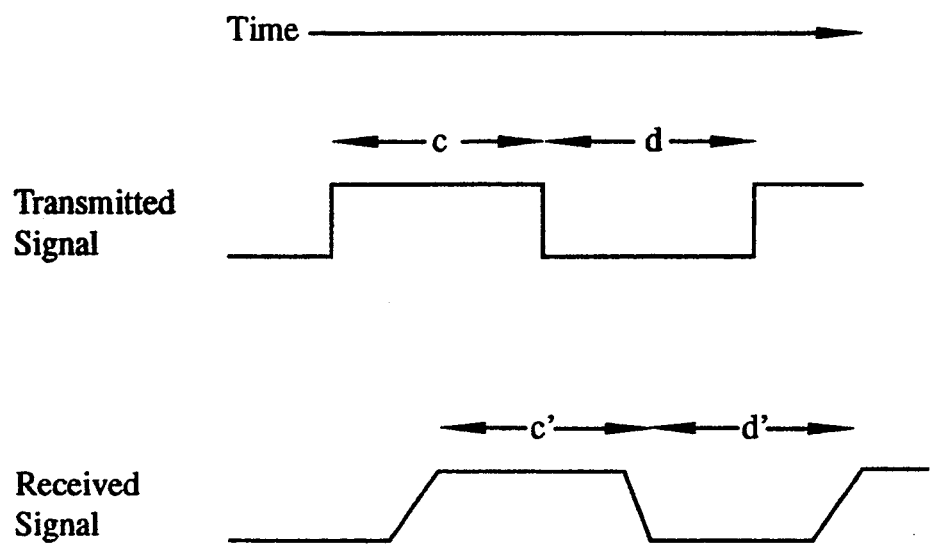

FIG. 13 explains the second part of message alignment, and shows a plurality of consecutive synchronising pulses, both as transmitted and as received. The transmitted synchronising pulse signaling sequence is fixed and yields predictable results at the receiving nodes while taking into account deviations due to signal strength. In the received signal (c') is pulse ON time and (d') is pulse OFF time.

Receiving nodes compute the average of the signaling characteristics (c') and (d') for a number of synchronising pulses and compare the analyzed signal times with that of the known references (c) and (d). The intelligent micro-controller computes the ratio of (c') to (c), (d') to (d), and the overall (c'+d') to (c+d) deviations. This information yields predictable results with respect to signal strength verses signaling alignment.

For a received signal of average strength, (c') and (d') are approximately equal to (c) and (d) respectively. This is the cleanest signaling scenario and provides the best results with respect to overall message alignment. No further correction to the message pre-alignment factor is needed.

For a strong signal, (c') is slightly greater in duration than (c), and also (d') is slightly less in duration than (d). The overall (c'+d') to (c+d) ratio is at par (approximately equal). A strong signal results in a slower edge decay time of the signal's trailing edge. Thus the message pre-alignment factor is further adjusted to take into account the trailing edge decay time affect.

A weak signal yields a reduction in the duration of (c') as compared with (c) and an increase in the duration of (d') as compared with (d). Typically the overall (c'+d') to (c+d) ratio is greater than par, identifying a slight difficulty for receiver lock onto the synchronization pulse sequence. Computing an average (c'+d') to (c+d) ratio from the successive pattern of synchronization pulses will provide the information to further adjust the message pre-alignment factor.

AS a result of the initial message pre-alignment followed by further adjustment if necessary, the timing of the synchronising pulses as perceived by the node is adjusted to correspond as nearly as possible to the timing of the actual transmitted pulses. Now, since the number of synchronising pulses is known, the node can identify the trailing edge of the last such pulse and hence establish the Sync Reference Time.

Note that in the event that signal ratios must fall within a certain range of typically expected values. If not within these ranges, the recipient node will not enter into the STS re-iteration process following the iteration received.

Clearly, because synchronisation of simultaneously transmitting nodes will not be perfect, a re-iterated message will have a slight alignment error. Proper computation of the message alignment factor can reduce this deviation to a tolerable amount. Because this deviation accumulates for each re-iteration of the message, there is a practical limit to the maximum number of routing interations, and exceeding this limit will result in communication timing errors to appear.

The percent of deviation with respect to bit time can be useful in determining practical limits of routing iterations. However, lowering the data rate of the STS network messages will increase the bit-time/deviation ratio and increase the maximum iteration value that can be used.

This leads to the possibility of changing the data rate according to the number of message iterations to be made. Thus, for a high Max Iteration Count the data rate can be lower than for a low count. This can be done either on a whole transaction basis, i.e. the lower data rate is the same for each iteration in the transaction, or on an iteration basis, i.e. the data rate decreases for each successive request iteration in the transaction and each successive response iteration in the transaction. This can be readily programmed into the node software.

6. Transaction Examples

A. Interactive Transaction

The "Interactive Transaction" is used by the master node to converse with an individual slave node. Application requests use interactive transactions to perform their tasks involving remote nodes. The master node issues a request to a specific slave node. The transaction completes with the master's receipt of the slave's response to the request. The example now to be described with reference to FIGS. 14A to 14H assumes a basic network as shown in FIG. 1, with all nodes participating.

The symbols used in FIGS. 14A to 14H are defined as follows:

M—denotes the Master node of the network domain. This is the controlling node which initiates transactions.

S#—denotes the Slave node which is the "target" or destination of an STS Request.

*S#*—the asterisk symbol before and after the slave ID denotes a target node of the transaction request.

( )—the parenthesis symbols identify an idle node. When idle, a node will continually monitor the air-ways for wireless activity.

[]—the bracket symbols indicate that the associated node is currently sending a frame.

{}—the brace symbols indicate that the associated node id currently receiving a frame.

. . . . dotted lines indicate the data link pathways between adjacent nodes in the network.

- - - - continuous lines indicate wireless activity or information being sent by a transmitting node.

Figure 14A:
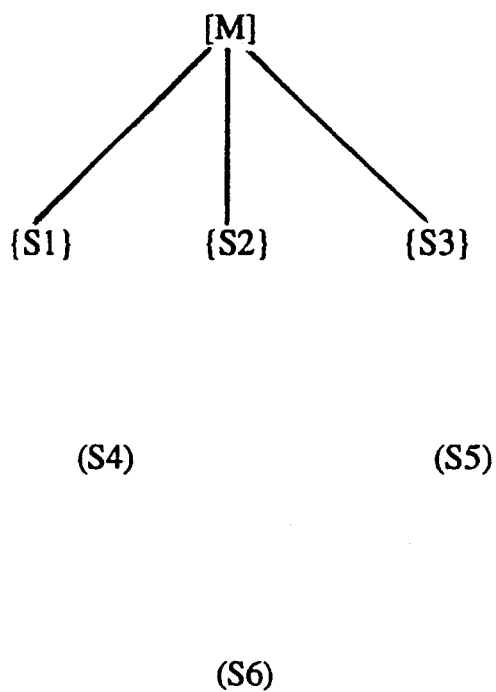

FIG. 14A: A transaction request frame is initiated by the master node, specifying node S6 as the target node. Thus the master sets a Maximum Iteration Count of 3, and a Current Iteration Count of 1. 0n iteration #1 the request is received by slave nodes S1, S2, and S3, which update the Current Iteration Count to 2 and prepare to reiterate the request.

Figure 14B:
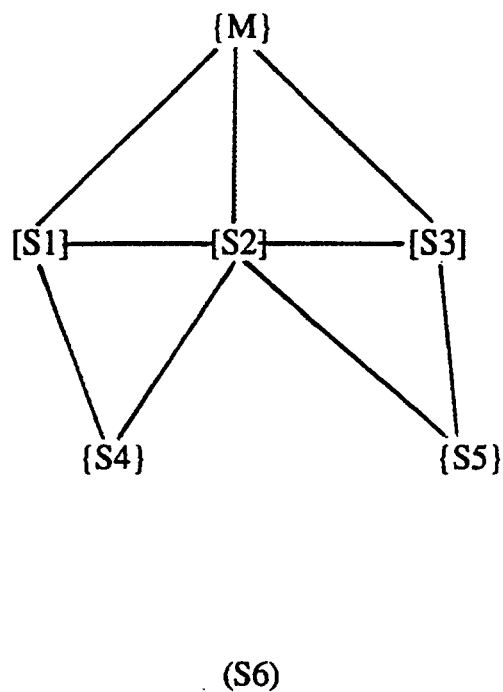

FIG. 14B: S1, S2 and S3 re-iterate the request. The master node assumes receive mode for monitoring the STS iteration activity now being routed by slave nodes S1, S2, and S3. S4 and S5 receive the request on iteration #2. Note the multi-dimensional routing by STS nodes. This simultaneous synchronised transmission by multiple intermediate nodes such as S1 to S3 is a primary aspect of the STS system. When the request is received by S4 and S5, they update the Current Iteration Count to 3 and prepare to reiterate the request.

Figure 14C:
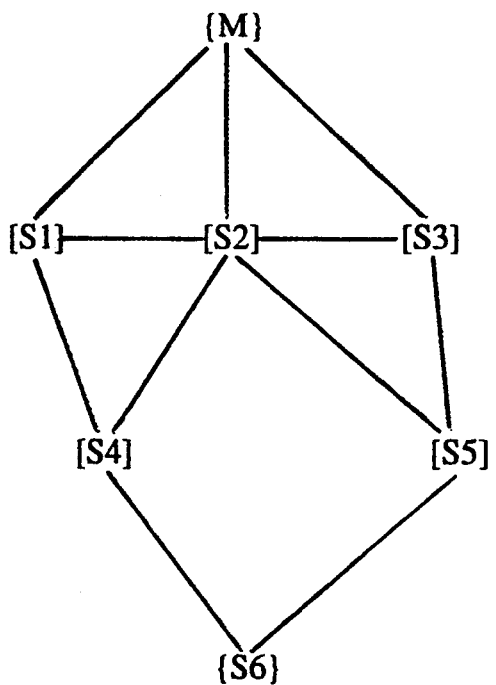

FIG. 14C: S4 and S5 re-iterate the request. Node S6 receives the request on iteration #3 from two directions by way of the two intermediate nodes S4 and S5. Thus the redundant routing inherent in the STS process improves the integrity of network routing. At this point, all participating slave nodes recognize that the last iteration (3 of 3) has been routed. These nodes will determine if they are targets of the request.

Figure 14D:
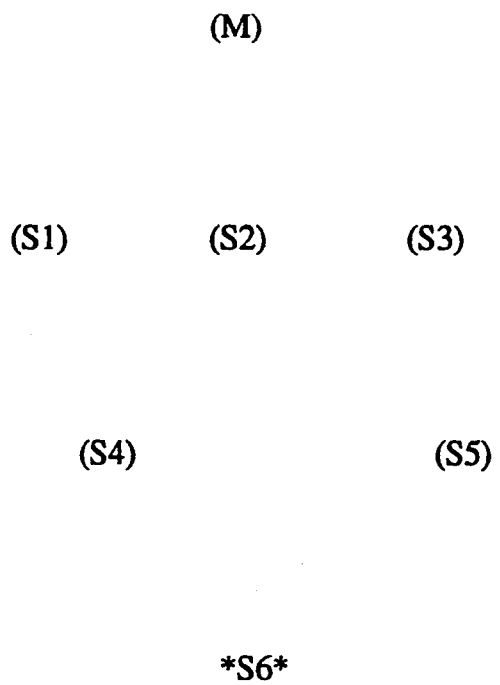

FIG. 14D: The nodes now determine the destination of the request, and assume an idle state (if not a target), or an active response state (target). In this case node S6 is identified as the target. All other nodes enter an idle state. Node S6 processes the request and immediately formulates a turnaround response with a Current Iteration Count of 1, the Maximum Iteration Count remaining at 3.

FIG. 14E: Node S6 now issues the response to the request. Recipient nodes S4 and S5, along with S6, update the Current Iteration Count to 2 and prepare to re-iterate the response message.

FIG. 14F: S4 and S5 re-iterate the response, which is received by S4, S5, and S6. Nodes S1, S2, and S3 now update the Current Iteration Count to 3 and prepare to re-iterate the message.

FIG. 14G: All slave nodes are actively involved in the STS routing process. The master node receives the final simultaneously transmitted response and prepares to process it.

FIG. 14H: All slave nodes, upon recognizing the last iteration of the message has completed, become idle. The master node, upon processing the response, completes the transaction.

B. Broadcast Transaction

In this case the master node issues a "broadcast" request to multiple slaves. This particular request type is strictly a one way message with no response returned from any participating slave. The response is said to be "implied" and the transaction ends when all iterations of the request have been completed. A typical transaction would proceed as described above for the interactive transaction, except that it would end at FIG. 14D at which point every slave node would identify itself as a target. The broadcast transaction is particularly useful for synchronizing the network and broadcasting network related conditions.

Network Time-of-Day (TOD) synchronization between the nodes can be closely approximated (to the second). The first iteration of a broadcast transaction may have the current time-of-day information in it. Upon completion of the time-of-day broadcast, participating nodes simply perform the following:

TOD=(TOD_info_from_Frame)+ (total_iterations*iteration_time) where:

TOD_info_from_Frame=is the value Time of Day value contained in the broadcast message frame that is received by the node.

total_iterations=is the value extracted from the "Max Iteration Count" field of the broadcast message frame.

iteration_time=is the time required for a single iteration to be performed for the broadcast transaction.

In practice a typical STS network could synchronize nodal TOD clocks to within a few seconds for the total network.

C. Overlay Transaction

In an overlay transaction, the STS system forms a single response frame with overlaid contributions of many slave nodes within the system. Each participating slave includes its specific response information within a particular segment or slot of the overlay response. Each slot may represent a unique slave node or a condition shared by multiple nodes.

The overlay request frame issued by the master node includes data specifying either that all receiving nodes are to participate in the operation, or when only selected nodes are to participate, specifying the addresses of the selected nodes. The overlay frame is different from a normal request frame in that its 'body' (message portion 3, FIG. 9) builds as the iterations are sent. Otherwise, the overlay frame has basically the same format as that shown in FIG. 9, except that due to the dynamic modification of the body, providing an overall error check sum for the frame is not possible. However, the head and tail of the overlay frame, i.e. the parts preceding and following the body portion, use individual error checksum codes for validation of the frame.

When the overlay request frame is received by a participating slave node, that node will overlay it's response data into the body of the frame and re-send it. However, unlike the interactive transaction where once a node has sent a frame it remains in a transmit mode, in the present case a participating node will alternate between transmit and receive modes during the whole overlay transaction. The Max Iteration Count placed in the overlay request frame issued by the master node establishes the extent (number of iterations) to which the overlay request frame is broadcast throughout the network while still being capable of having overlay information added to it, the overlay request frame reaching its furthest extent when the Current Iteration Count equals the Max Iteration Count. At that point all participating nodes, after adding their own response data and prior to re-transmitting the frame, re-set the Current Iteration Count to 1 and specify the frame to be a response frame. Once the frame has been specified to be a response frame no more information can be added to it. When the Current Iteration Count once again equals the Max Iteration Count the transaction is complete.

It will be evident that the master node will obtain some of the overlay information, from the nearer nodes, before the overlay transaction is complete. This permits it to start whatever processing is required at that time. However, it will not receive a complete overlay response frame, containing all the requested information, including that from the furthest participating nodes, until all iterations have completed.

Figure 15:
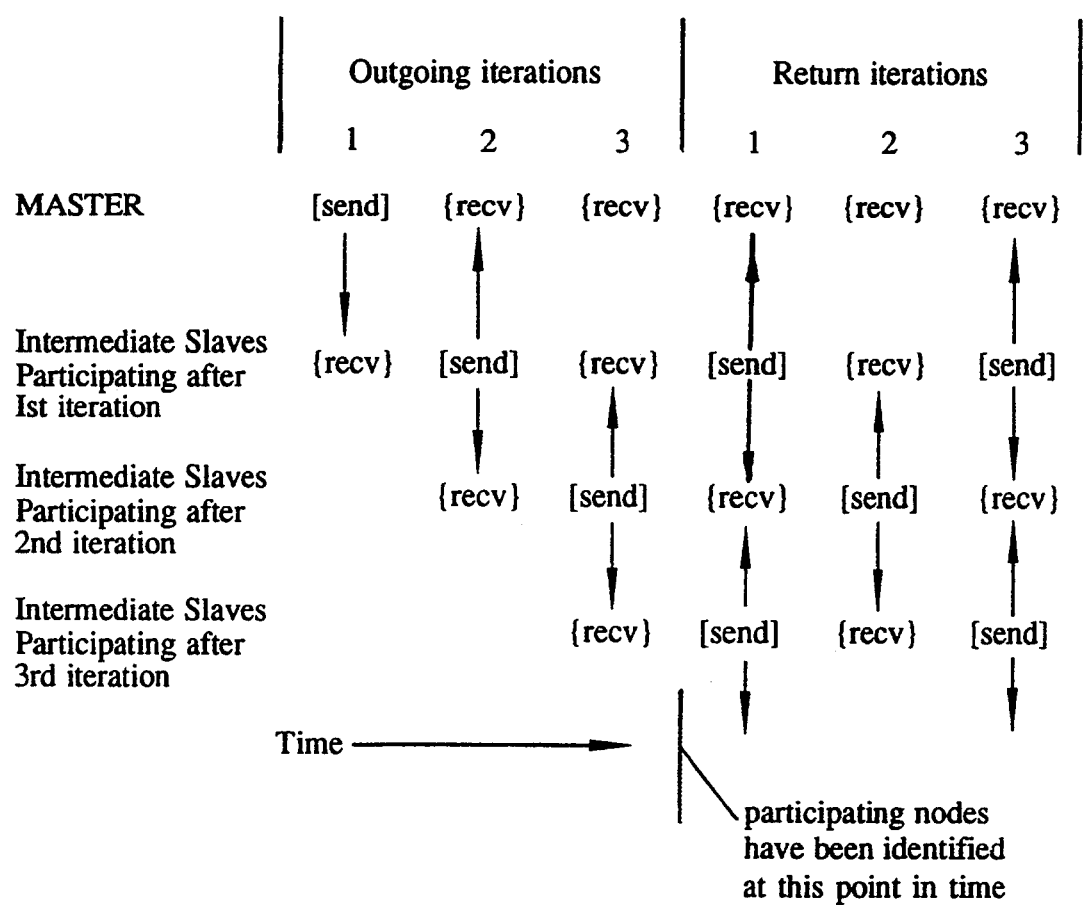
FIG. 15 illustrates an overlay transaction.

FIG. 15 illustrates an overlay operation. Three iterations out and three iterations back are assumed. Thus the master node sets Max Iteration Count=3 into the initial overlay request frame. As the frame is relayed outwards, each receiving node sets its information into the appropriate slot in the frame and resends the frame. Thereafter the node alternates between receive and send until the overlay transaction is complete.

After three "outgoing" iterations Current Iteration Count=3, so from the next iteration onward the frame is regarded as a response frame and no further information may be inserted in the frame by the nodes. After three "incoming" iterations the Current Iteration Count is again=3, and the transaction is ended. It will be observed that while the master node will have received some overlay information by the second outgoing iteration, it will not have received a complete overlay frame until the final return iteration.

7. Flow Diagrams

A. Interactive Transaction

Figure 16:
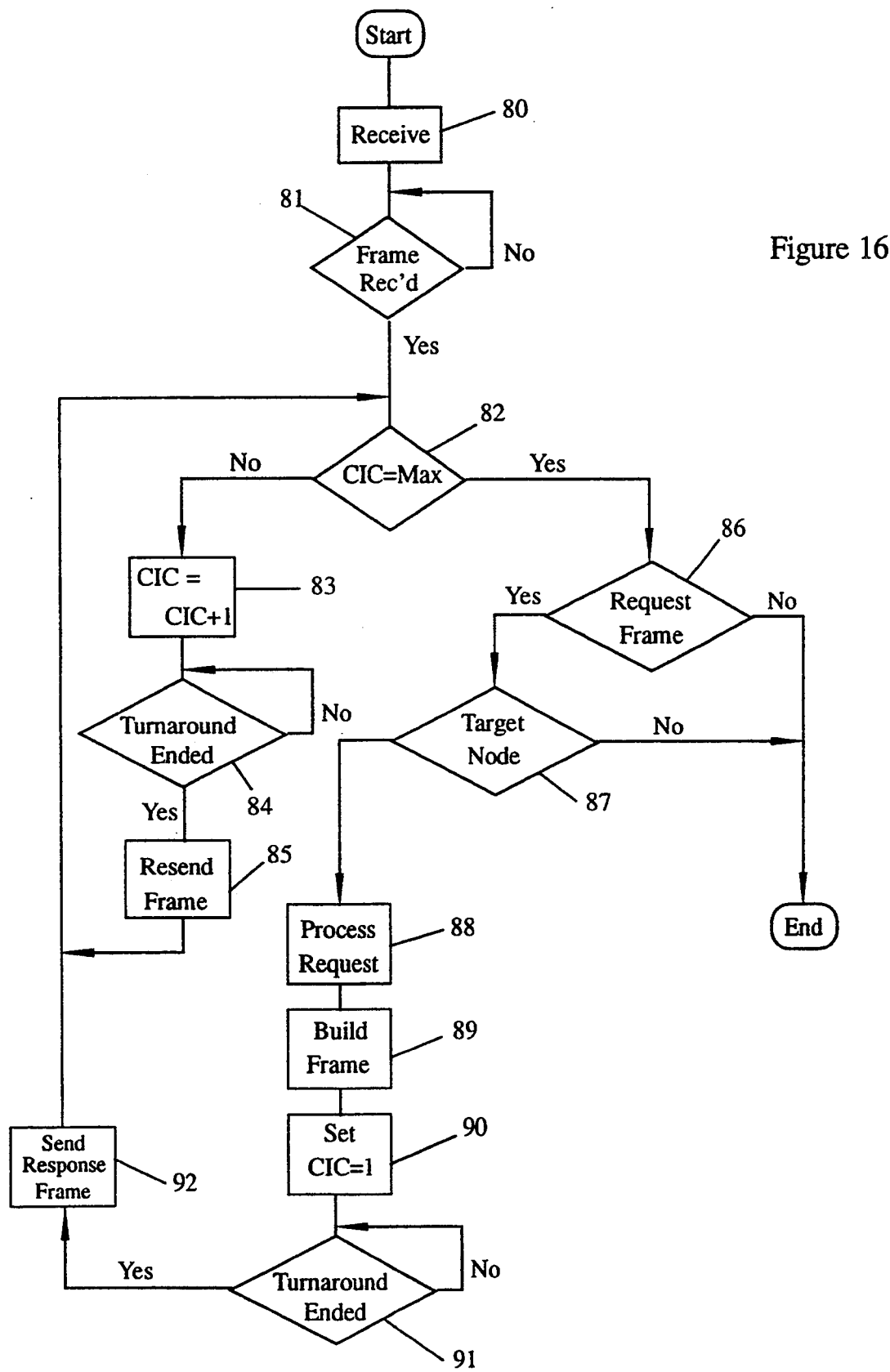
FIG. 16 is a flow diagram of the operation of a slave node during an interactive transaction.

FIG. 16 is a flow diagram of the programmed operation of a slave node with respect to an interactive transaction.

Initially the slave node is in receive mode 80, wherein it is monitoring for a message frame. The process for receiving a message frame is as previously described with reference to FIG. 10. Step 81 determines when a frame has been received, i.e. that turnaround state 6 (FIG. 10) has been entered.

Now the node checks whether the Current Iteration Count (CIC) in the received frame equals the Max Iteration Count, step 82. If it is not, the frame has to be re-transmitted by the node, so at step 83 the CIC in the frame is incremented by 1. Now the node checks for the end of turnaround time, step 84, after which the frame is re-transmitted, step 85, as previously described with reference to FIG. 11. Transmission of the frame is complete when turnaround state 14 (FIG. 11) has been entered.

Now the process loops back to step 82, and all the while the last iteration has not been made (CIC not equal to Max Iteration Count at step 82), control will pass down the left hand branch of FIG. 16 and the previously transmitted frame, which is held in a buffer in the node, will be re-transmitted on each iteration of the message through the network, until CIC=Max Iteration Count.

The above assumes that the node is participating in the process. If, however, the message frame specifies that it is not to participate, this is determined prior to step 84 and the frame is not sent at step 85. However, other than not actually sending the frame, all other output processing as described with reference to FIG.

11 is still performed in this case, in order to establish and enter the turnaround state 14.

If at step 82 it is determined that a message has been iterated for the last time (CIC=Max Iteration Count), whether such message be a newly received frame or one previously received and continuously re-transmitted by the node as described above, then at step 86 the node determines whether the frame is a request frame or a response frame. If it is a response frame, the node's participation in the transaction is ended. Otherwise, if it is a request frame, the node further tests whether it is itself a target of the request, step 87. If not then again the node's participation in the transaction is ended.

However, where the node is a target, it processes the request and builds a response frame, steps 88 and 89, and sets the CIC equal to 1 in the response frame, step 90. Now the node checks for the end of turnaround time, step 91, after which the response frame is transmitted, step 92.

Now the node will cycle round the left hand branch of FIG. 16 (steps 82 to 85) and the response frame, which is held in a buffer in the node, will be re-transmitted on each iteration of the message through the network, until CIC=Max Iteration Count.

B. Broadcast Transaction

The flow diagram for a broadcast transaction is the same as that shown in FIG. 16, except that since no response has to be made, the right hand branch of the diagram will terminate at step 88.

C. Overlay Transaction

Figure 17:
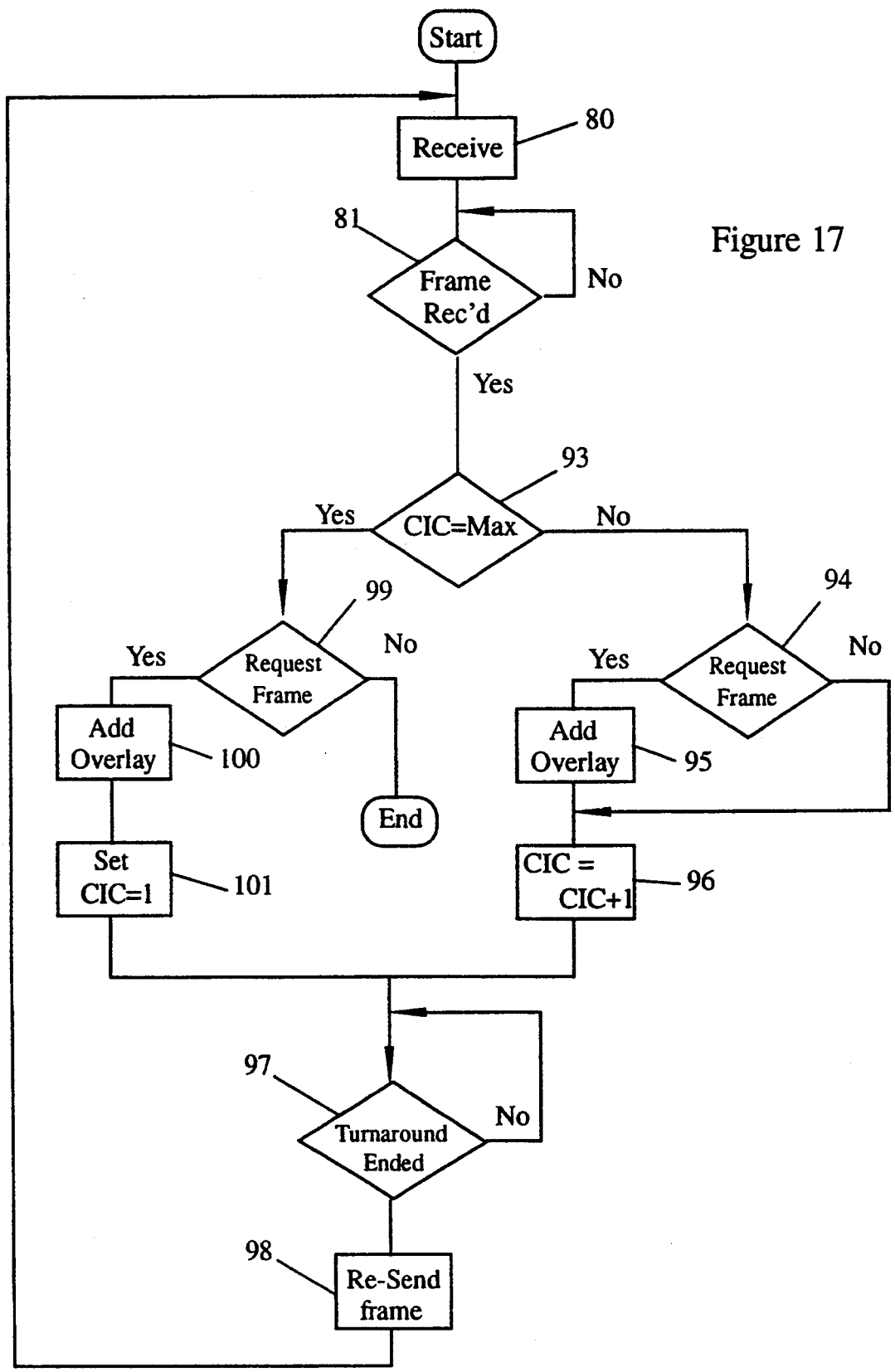
FIG. 17 is a flow diagram of the operation of a slave node during an overlay transaction.

FIG. 17 is a flow diagram of the programmed operation of a slave node with respect to an overlay transaction.

Steps 80 and 81 are as before. When a frame is received (turnaround state 6 has been entered) step 93 tests whether CIC=Max Iteration Count. If not, step 94 determines if the frame is a request frame (overlay data may still be added) or a response frame (no further overlay information may be added). In the former case step 95 adds the overlay data to the frame and step 96 increments the CIC by 1; in the latter case step 95 is omitted. Now the node checks for the end of turnaround time, step 97, after which the frame is re-transmitted, step 98. Now the node re-enters receive mode 80.

If at step 93 CIC is found to equal Max Iteration Count, step 99 tests whether the frame is a request frame or a response frame. If it is a response frame the node's participation in the transaction is over. If it is a request frame the node's overlay data is added at step 100. Then step 101 sets the CIC back to 1 and specifies the frame now to be a response frame. Now control passes to steps 97 and 98, and the frame is transmitted.

It will be seen from the flow diagram that all nodes which receive a frame in the overlay transaction alternate between send and receive modes in consecutive iterations.

I claim:

1. A radio communication system comprising a transmitter for transmitting a radio message having a predetermined format, a plurality of transceivers within range of the transmitter and a plurality of receivers out of range of the transmitter but within range of one or more of the transceivers, wherein each of the transceivers is arranged, upon receipt of the message in said predetermined format and subject to the contents of the message, to re-transmit the message substantially in synchronism with any and all other of the transceivers which received the message at the same time as said one or more of the transceivers, and wherein the message includes iteration data which defines the number of times the message has been transmitted or re-transmitted and the total number of times the message is to be transmitted or re-transmitted, and wherein said each of the transceivers upon receipt of the iteration data includes means which is responsive to the iteration data in the message to determine if the last transmission or re-transmission has been made and if so not to re-transmit the message to one or more of said transceivers and receivers and if not to update the iteration data by changing the data which defines the number of times the message has been transmitted or re-transmitted and re-transmit the message.

2. A radio communication system comprising a first transceiver for transmitting and receiving radio messages having a predetermined format and a plurality of further transceivers of which some but not all are out of range of the first transceiver and none of which is out of range of all the others, wherein each of the further transceivers is also arranged to transmit and receive radio messages having said pre-determined format, said each of said further transceivers further being arranged, and including means upon receipt of a radio message in said predetermined format and subject to the contents of the message, to re-transmit the message substantially in synchronism with any and all other further transceivers which received the message at the same time as said each of the further transceiver, and wherein the radio message includes iteration data which defines the number of times the message has been transmitted or re-transmitted and the total number of times the message is to be transmitted or re-transmitted, and wherein said each of said further transceivers upon receipt of the iteration data includes means which is responsive to the iteration data in the message to determine if the last transmission or re-transmission has been made and if so not to re-transmit the message to at least one of said plurality of further transceivers and if not to update the iteration data by changing the data which defines the number of times the message has been transmitted or re-transmitted and then to re-transmit the message.

3. A radio communication system as claimed in claim 2, wherein the radio message contains participation data defining for said each of said further transceivers whether or not it is to re-transmit the message, and wherein said each of said further transceivers is responsive to the participation data in the message to re-transmit or not re-transmit the message as defined by the data.

4. A radio communication system as claimed in claim 2, wherein said each of said further transceivers is arranged, in respect of the message which said each of said further transceivers has received and re-transmitted, to store said message until all subsequent re-transmissions have taken place.

5. A radio communication system as claimed in claim 4, wherein the radio message includes address data identifying a specific further transceiver and request data requiring a response from said specific further transceiver, and wherein said each of said further transceivers is arranged to determine from said address data, when all re-transmissions of the message have taken place, if it is said specific further transceiver and if so to construct and transmit a further message of said predetermined format containing response data to the first transceiver.

6. A radio communication system as claimed in claim 2, wherein the radio message contains a portion in which all or selected ones of the further transceivers, as defined by data in the message which requests response data, are to place response data prior to re-transmission of the message, and wherein said each of said further transceivers is arranged to determine from the message if it is required to place said response data in said message portion, and if so, to do so and if not, not to do so.

7. A radio communication system as claimed in claim 6, wherein the iteration data defines an initial number of re-transmissions fin respect of which a further transceiver receiving the message places said response data in said message portion, and a further number of re-transmissions in respect of which a further transceiver receiving the message does not place said response data in the message portion, and wherein said each of said further transceivers is responsive to said iteration data upon receiving the message for re-transmission to determine whether or not it is to place said response data in said message portion and to place or not place said response data accordingly.

8. A radio communication system as claimed in claim 2, wherein the radio message includes synchronizing data whose characteristics are known by said each of said further transceivers, and wherein said each of said further transceivers is responsive to the synchronizing data in the message to establish a point in time which is substantially common to any and all further transceivers which received the message, said each of said further transceivers re-transmitting the message, subject to the contents of the message, starting a predetermined period after the common point in time.

9. A radio communication system as claimed in claim 2, wherein the first transceiver is mobile.

* * * * *

UNITED STATES PATENT AND TRADEMARK OFFICE
CERTIFICATE OF CORRECTION

PATENT NO. : 5,369,784
DATED : November 29, 1994
INVENTOR(S) : Daniel R. Nelson

It is certified that error appears in the above-indentified patent and that said Letters Patent is hereby corrected as shown below: Title page: col. 2, In the Attorney names:
    "HEneveld" should be --Heneveld--.
Column 1, line 44:
    After "2B" delete --is--.
Column 17, line 13:
    "AS" should be --As--.
Column 23, line 12:
    "fin" should be --in--.

Signed and Sealed this

Twenty-second Day of August, 1995

Attest:

BRUCE LEHMAN

Attesting Officer    Commissioner of Patents and Trademarks